United States Patent
Sharif

(10) Patent No.: US 10,486,642 B2
(45) Date of Patent: Nov. 26, 2019

(54) SEATBELT POSITIONING ASSEMBLY

(71) Applicant: Nissan North America, Inc., Franklin, TN (US)

(72) Inventor: Curtis Sharif, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 166 days.

(21) Appl. No.: 15/680,928

(22) Filed: Aug. 18, 2017

(65) Prior Publication Data
US 2019/0054892 A1 Feb. 21, 2019

(51) Int. Cl.
*B60R 22/20* (2006.01)
*B60N 2/02* (2006.01)
*B60R 22/18* (2006.01)

(52) U.S. Cl.
CPC ........... *B60R 22/20* (2013.01); *B60N 2/02* (2013.01); *B60R 2022/1818* (2013.01); *B60R 2022/207* (2013.01); *B60R 2022/208* (2013.01)

(58) Field of Classification Search
CPC ............ B60R 22/20; B60R 2022/1818; B60R 2022/207; B60R 2022/208; B60N 2/02
USPC .................................................... 280/801.2
See application file for complete search history.

(56) References Cited

U.S. PATENT DOCUMENTS

2016/0207496 A1* 7/2016 Tanabe ................. B60R 21/207

FOREIGN PATENT DOCUMENTS

JP 2010111294 A * 5/2010

* cited by examiner

*Primary Examiner* — Joseph M Rocca
*Assistant Examiner* — Hilary L Johns
(74) *Attorney, Agent, or Firm* — Global IP Counselors, LLP

(57) ABSTRACT

A seatbelt positioning assembly, includes a base member, an extensible member, a positioning mechanism and an electronic controller. The base member is configured to attach to a vehicle pillar structure of a vehicle adjacent to a vehicle seat assembly. The extensible member is coupled to the base member and has a D-ring of a seatbelt assembly fixed a distal end thereof. The positioning mechanism is connected to the extensible member and is supported to the base member. The position mechanism is configured to move the extensible member such that the D-ring is positioned and re-positioned between a stowed position adjacent the vehicle pillar structure and an extended position adjacent to the vehicle seat assembly. The electronic controller is connected to the positioning mechanism and configured to operate the positioning mechanism to move the extensible member positioning the D-ring between the stowed position and the extended position.

16 Claims, 8 Drawing Sheets

SEATBELT POSITIONING ASSEMBLY

BACKGROUND

Field of the Invention

The present invention generally relates a seatbelt positioning assembly. More specifically, the present invention relates to a seatbelt positioning assembly that moves a D-ring of a seatbelt assembly between a retracted position along a surface of a pillar structure, and an extended position such that the D-ring is located proximate an upper area of a seat assembly spaced apart from the pillar structure in order to position a flexible belt of the seatbelt assembly extending through the D-ring to a comfortable location relative to a vehicle passenger seated in the seat assembly.

Background Information

All road legal vehicles basically include seatbelt assemblies, where a flexible belt is retracted when not in use by a retracting mechanism. The flexible belt typically extends upward from the retraction mechanism and through a D-ring located on a pillar structure of the vehicle. D-rings are typically rigid rings that are fixed to the pillar structure, or are installed via a slidable structure to the pillar structure such that the D-ring can be moved vertically along the pillar structure in order to vertically position the flexible belt.

SUMMARY

One object of the present disclosure is to provide a seatbelt assembly with a D-ring separated and spaced apart from a pillar structure of a vehicle, with the D-ring being three dimensionally positionable to a plurality of positions relative to an adjacent seat assembly in order to position a flexible belt of a seatbelt assembly to a comfortable location relative to a vehicle passenger in the seat assembly.

In view of the state of the known technology, one aspect of the present disclosure is to provide a seatbelt positioning assembly with a base member, an extensible member, a positioning mechanism and an electronic controller. The base member is configured to attach to a vehicle pillar structure of a vehicle adjacent to a vehicle seat assembly. The extensible member is coupled to the base member, with a D-ring of a seatbelt assembly being fixed to a distal end of the extensible member. The positioning mechanism is connected to the extensible member and is supported to the base member. The position mechanism is configured to move the extensible member such that the D-ring is positioned and re-positioned between a stowed position adjacent the vehicle pillar structure and an extended position adjacent to the vehicle seat assembly. The electronic controller is connected to the positioning mechanism and is configured to operate the positioning mechanism to move the extensible member positioning the D-ring between the stowed position and the extended position.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
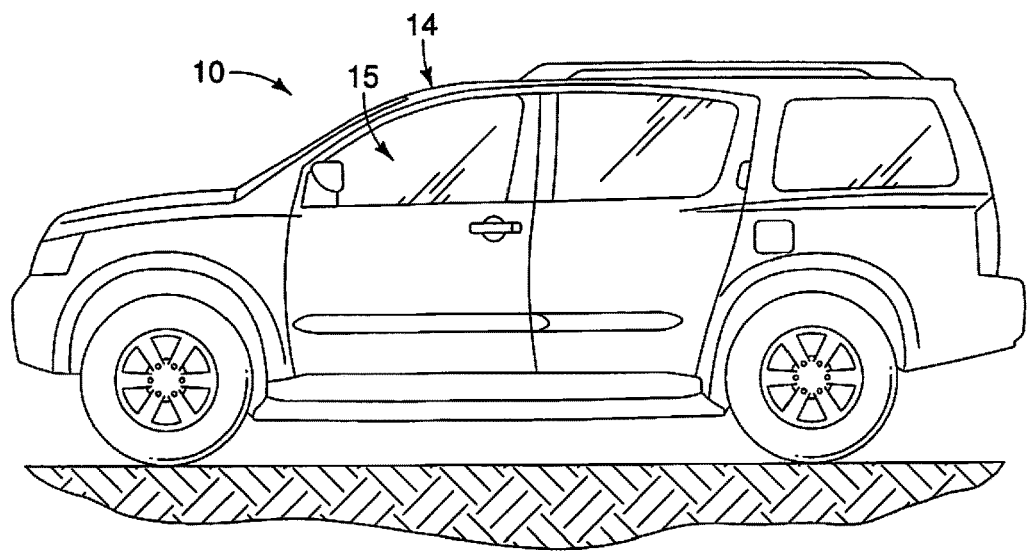
FIG. 1 is a side view of a vehicle that includes a passenger compartment in accordance with an embodiment.
Figure 2:
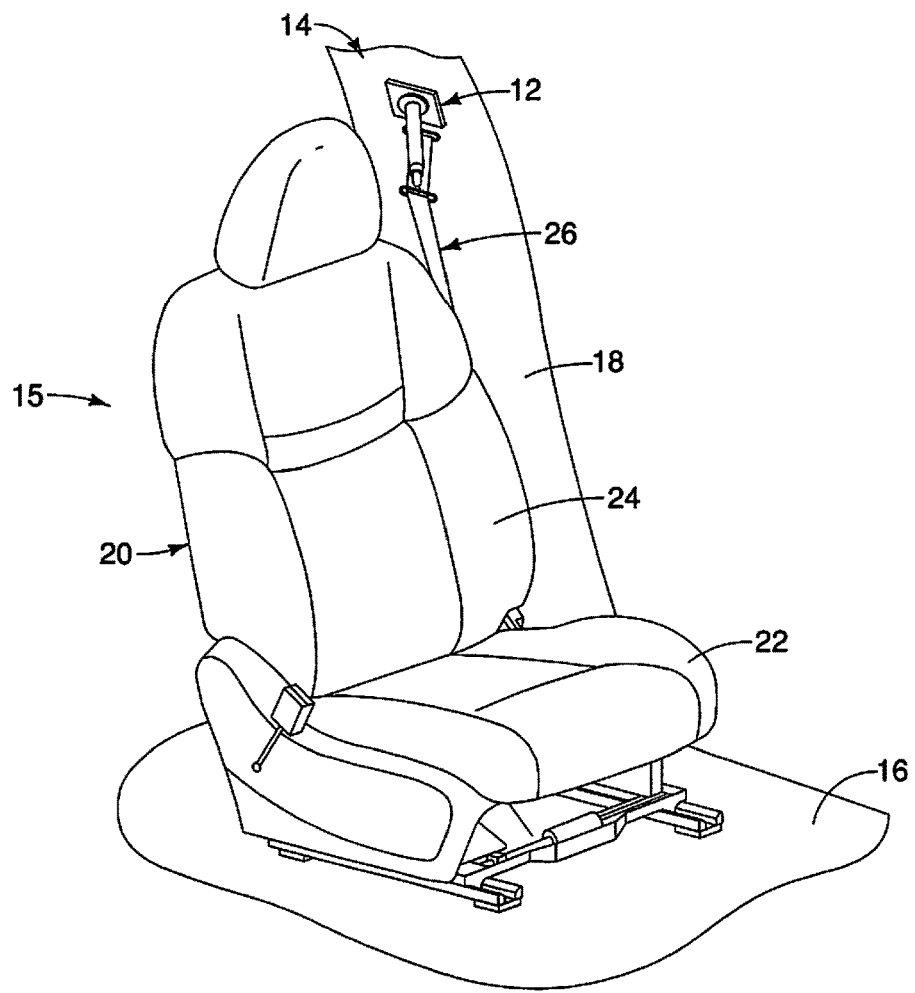
FIG. 2 is a perspective view of a portion of the passenger compartment of the vehicle depicted in FIG. 1, showing a seat assembly, a seatbelt assembly and a seatbelt positioning assembly in a retracted orientation in accordance with the embodiment.

Referring initially to FIGS. 1 and 2, a vehicle 10 having a seatbelt positioning assembly 12 is illustrated in accordance with a first embodiment.

As shown in FIG. 1, the vehicle 10 has a vehicle body structure 14 that defines a passenger compartment 15. As shown in FIG. 2, the vehicle body structure 14 includes a passenger compartment 15 with a floor structure 16, a pillar structure 18 and at least one seat assembly 20. The seat assembly 20 includes a seat cushion portion 22 that is attached to the floor structure 16, and a seatback portion 24 that is pivotally supported to the seat cushion portion 22 and is movable between an upright orientation (shown in FIG. 2) and a plurality of reclined orientations (not shown). The seat assembly 20 has associated there with a seatbelt assembly 26 installed thereto, as described in greater detail below. It should be understood from the drawings and the description herein that the passenger compartment 15 is provided with a plurality of seat assemblies 20, each seat assembly 20 having a corresponding seatbelt assembly 26. Further several of the seatbelt assemblies 26 can include a corresponding one of the seatbelt positioning assemblies 12. However, for the sake of brevity, only one seatbelt assembly 26 is described herein below. Since vehicle body structures and seat assemblies are conventional structures, further description is omitted for the sake of brevity.

Figure 3:
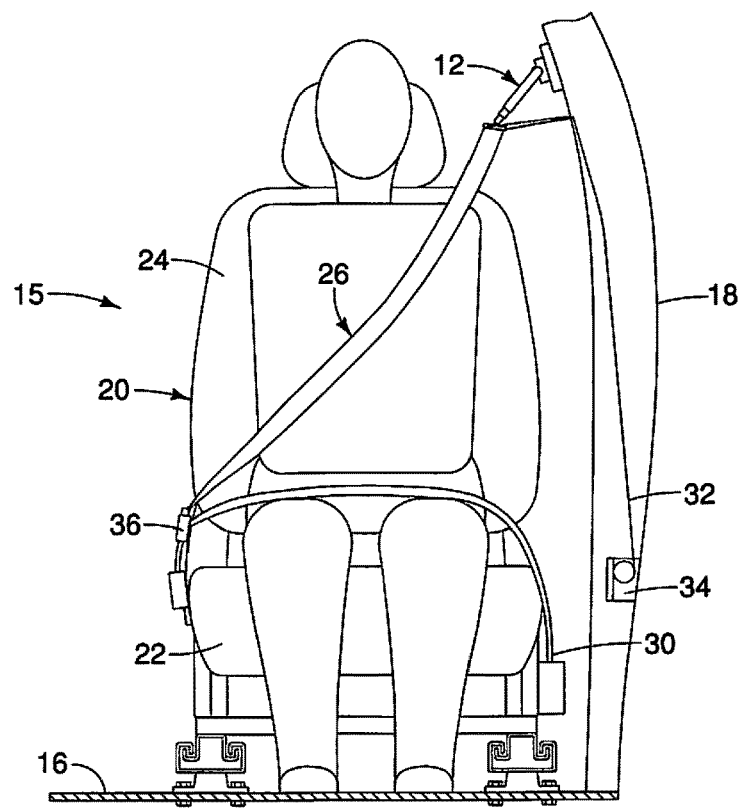
FIG. 3 is a front view of the portion of the passenger compartment of the vehicle depicted in FIG. 2, showing the seat assembly with a representation of passenger seated therein, the seatbelt assembly in an in-use position and the seatbelt positioning assembly in an extended orientation in accordance with the embodiment.
Figure 4:
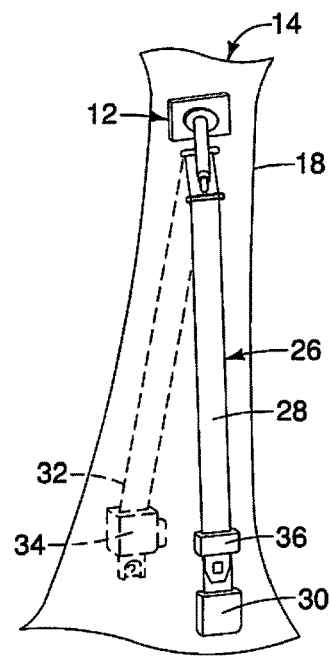
FIG. 4 is a perspective view of the seatbelt assembly and the seatbelt positioning assembly installed to a pillar structure of the vehicle, showing the seatbelt positioning assembly in the retracted orientation in accordance with the embodiment.

As shown in FIGS. 2, 3 and 4, the seatbelt assembly 26 includes a flexible belt 28 with a first end 30 and a second end 32, a retracting mechanism 34 and a latch tongue 36. The flexible belt 28 is also referred to as belt webbing and is preferably made of a conventional woven seatbelt material, such as nylon. However, it should be understood from the drawings and the description herein that the flexible belt 28 can be made of any of a variety of suitable conventional materials.

The first end 30 of the flexible belt 28 is attached to a side area of the seat cushion portion 22 in a conventional manner. The second end 32 of the flexible belt 28 is attached to and is retractable into the retracting mechanism 34. The retracting mechanism 34 is shown installed within the pillar structure 18. However, it should be understood from the drawings and the description herein that the retracting mechanism 34 can be installed on a trim surface of the pillar structure 18 visible within the passenger compartment 15, or can be fixed to the floor structure 16 in a conventional manner.

Figure 5:
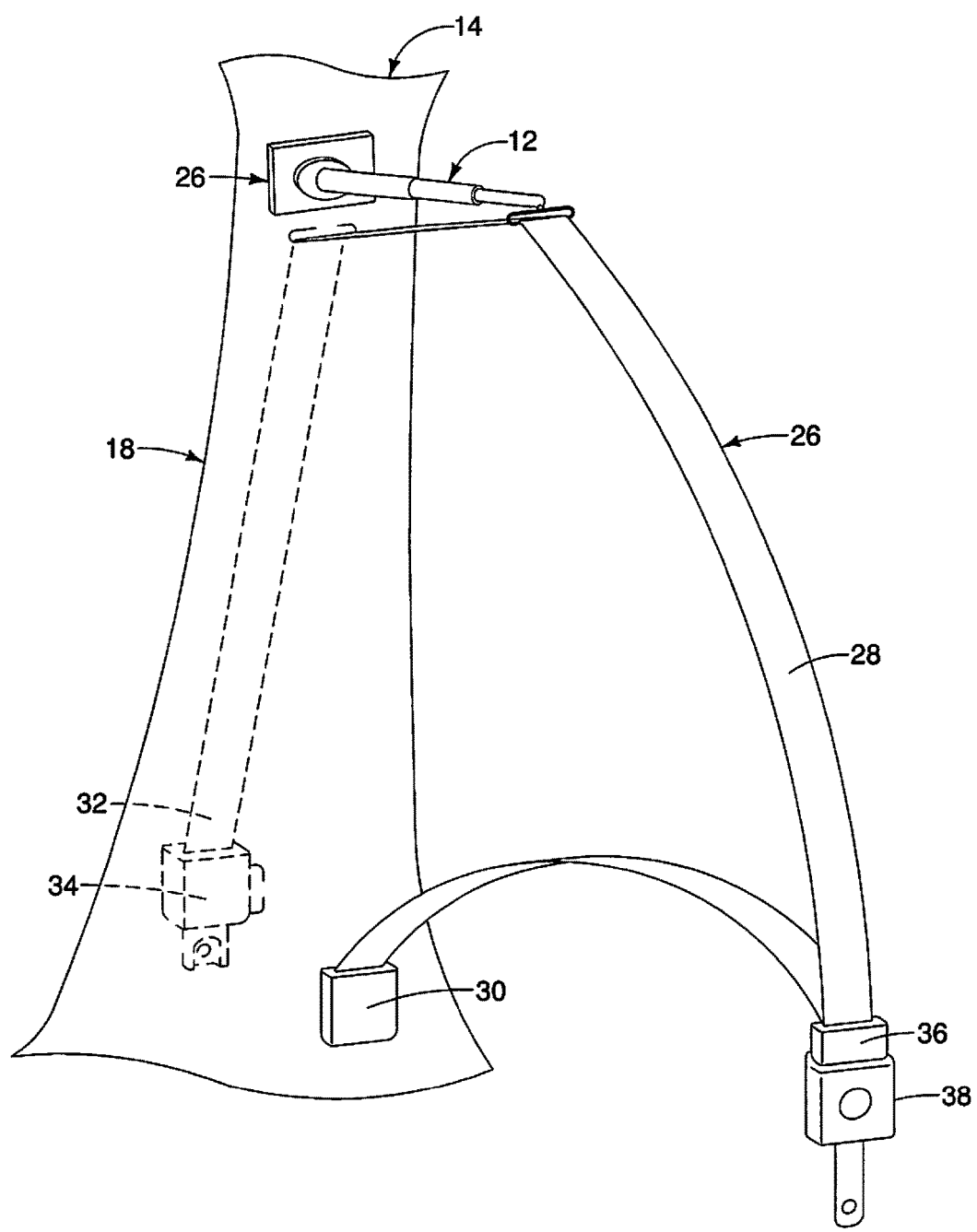
FIG. 5 is a perspective view of the seatbelt assembly and the seatbelt positioning assembly installed to the pillar structure of the vehicle, showing the seatbelt assembly in the in-use position and the seatbelt positioning assembly in the extended (in-use) orientation with the seat assembly removed for clarity in accordance with the embodiment.

In the depicted embodiment, the flexible belt 28 extends upward from the retracting mechanism 34 and through a reinforced slot 18a formed on the pillar structure 18, as shown in FIGS. 6-9. The latch tongue 36 is a conventional element that is slidably installed to the flexible belt 28 and is configured to releasably attach to a latch mechanism 38. The latch mechanism 38 is installed to the seat cushion portion 22 of the seat assembly 20 in a convention manner. The latch tongue 36 is shown attached to the latch mechanism 38 in FIG. 3 and shown released from the latch mechanism 38 in FIGS. 2 and 4. In FIG. 5 the latch tongue is shown in an orientation representing being attached to the latch mechanism 38 with the flexible belt 28 drawn out from the retracting mechanism 34. However, in order to clearly show all the various elements of the seatbelt assembly 26 in FIG. 5, the seat assembly 20 and the latch mechanism 38 are removed.

A description of the seatbelt positioning assembly 12 is now provided with specific reference to the schematic representations of the seatbelt positioning assembly 12 in FIGS. 6 through 13. The seatbelt positioning assembly 12 basically includes a base member 40, a motor 42a, a pivoting arm 42, a motor 42a, a pivoting base 44, extensible members 46a and 46b, a motor 46c and a D-ring 48.

The base member 40 is fixedly attached to the pillar structure 18 above the pillar slot 18a. The base member 40 can be a separate structure from the pillar structure 18, or can be an integral part of the pillar structure 18. In the depicted embodiment, the base member 40 is configured to attach to the vehicle pillar structure 18 adjacent to and just above the seatback portion 24 of the seat assembly 26 (also referred to as a vehicle seat assembly). The pivoting base 44 is supported by the base member 40 for pivoting movement about a vertical axis $A_V$. The base member 40 can include a vertically oriented shaft member (not shown) that defines the vertical axis $A_V$, with the vertically oriented shaft member being fixedly supported by the base member 40 such that the pivoting base 44 can undergo limited pivoting movement relative to the shaft member about the vertical axis $A_V$. The motor 42a (shown in FIGS. 10-13) includes a cable or gear driven mechanism that is configured to control pivoting movement of the pivoting base 44 relative to the base member 40.

The pivoting arm 42 is supported to the pivoting base 44 by the motor 40a. The motor 40a is attached to the pivoting base 44 and the pivoting arm 42 in order to control pivoting movement of the pivoting arm 42 about a horizontal axis $A_H$. The motor 40a can include a pivot pin (not shown) supported to the motor 40a. The pivot pin supported to the motor 40a defines the horizontal axis $A_H$. The motor 40a is fixedly attached to the pivoting base 44 and includes a gearing mechanism (not shown) that connects the motor 40a to the pivoting arm 42 in order to effect positioning and pivoting movement of the pivoting arm 42 about the horizontal axis $A_H$. Alternatively, the motor 40a can be fixedly attached the pivoting arm 42 with the pivot pin being supported by the pivoting base 44 such that the motor 40a and the pivoting arm 42 can be pivotal together about the horizontal axis $A_H$ in order to effect positioning and pivoting movement of the pivoting arm 42 about the horizontal axis $A_H$.

The pivoting arm 42 is a hollow structural element similar to a vehicle radio antenna with the extensible members 46a and 46b being supported therein for telescoping movement relative to the pivoting arm 42. In other words, the pivoting arm 42, the extensible member 46a and the extensible member 46b define a telescoping structure.

As shown in FIGS. 10-13, the motor 46c is supported on the base member 40 or the pillar structure 18 and includes a cable 46d (shown in FIGS. 12 and 13) that extends from a reel 46e within the motor 40a and through the pivoting arm 42, the extensible member 46a and the extensible member 46b. A distal end of the cable 46d is fixed within the extensible member 46b adjacent to the D-ring 48. Operation of the motor 46c causes telescoping movement of the extensible members 46a and 46b from a retracted orientation shown in FIG. 12 to an extended orientation shown in FIG. 13.

The motor 40a, the motor 42a and the motor 46c are electric motors that basically define a positioning mechanism for positioning and re-positioning the pivoting arm 42, the pivoting base 44 and the extensible members 46a and 46b, and thereby positioning the D-ring 48. Specifically, the elements that define the positioning mechanism are configured to move the extensible members 46a and 46b such that the D-ring 48 is positioned and re-positioned between a stowed position adjacent the pillar structure 18 (also referred to as a vehicle pillar structure) and an extended position adjacent to the seat assembly 20 (also referred to as a vehicle seat assembly).

Figure 14:
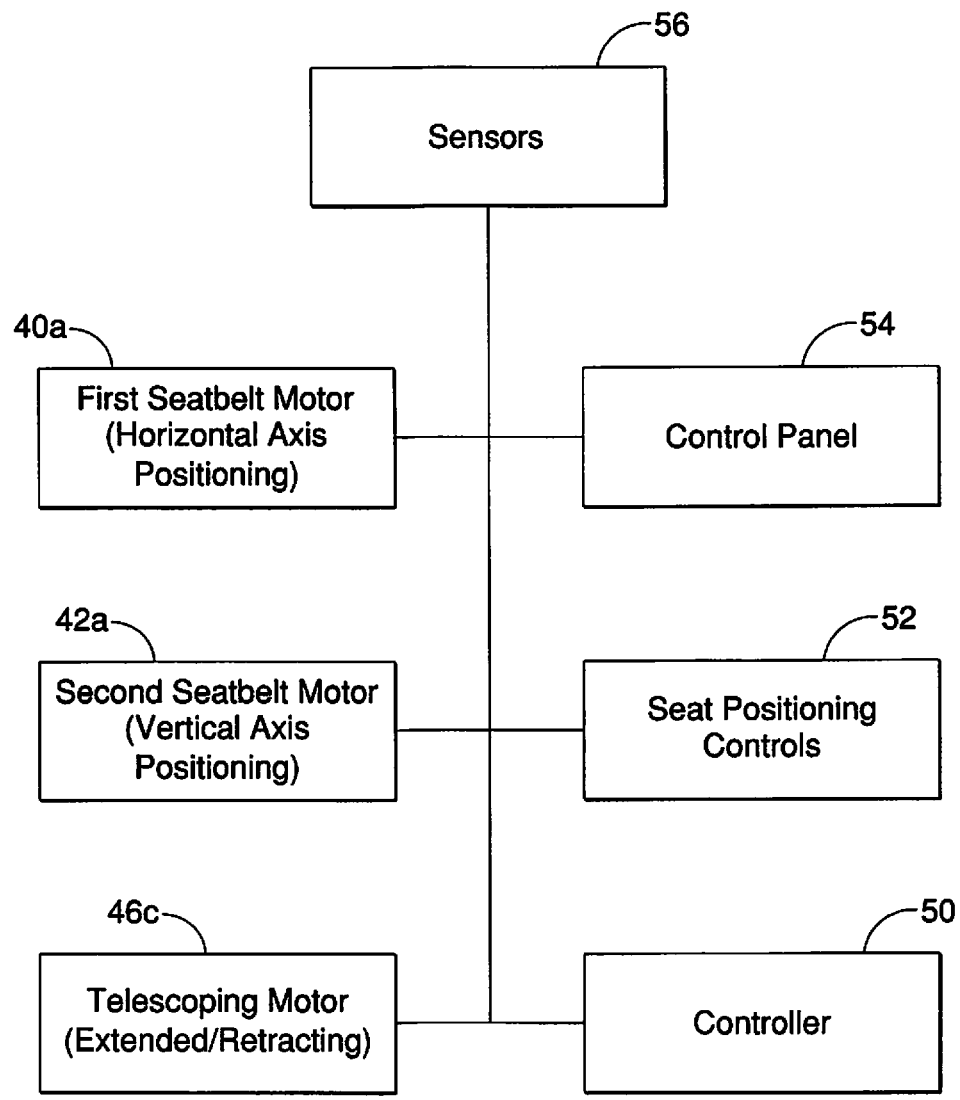
FIG. 14 is a block diagram of a controller connected to various motors of the seatbelt positioning assembly in accordance with the embodiment.

The motor 40a, the motor 42a and the motor 46c are all electrically connected to an electronic controller 50, as shown in FIG. 14. The electronic controller 50 is further connected to seat positioning controls 52, a control panel 54 and optional sensors 56. The seat positioning controls 52 preferably installed to a side portion of the seat cushion portion 24 of the seat assembly 26, but can alternatively be located on an instrument panel (not shown) or a door of the vehicle 10. The seat positioning controls 52 are conventional controls that are used by a vehicle occupant to adjust the forward/backward positioning of the seat cushion portion 22 relative to the floor structure 16, and an angle of the seatback portion 24 reclined relative to the seat cushion portion 22 in a conventional manner. Since seat positioning controls 52 are conventional vehicle features, further description is omitted for the sake of brevity.

The control panel 54 is preferably installed to the instrument panel (not shown) of the vehicle 10 and includes three-way adjustment controls for operating the motor 40a (also referred to as a first seatbelt motor for positioning relative to the horizontal axis $A_H$), the motor 42a (also referred to as a second seatbelt motor for positioning relative to the vertical axis $A_V$) and the motor 46c (also referred to as a telescoping motor for extending and retracting the extensible members 46a and 46b, thereby positioning of the D-ring 48).

Figure 6:
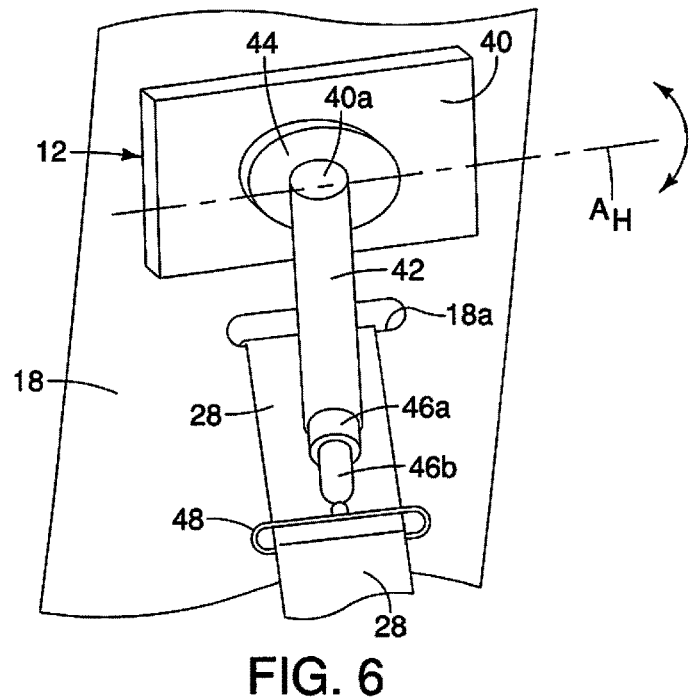
FIG. 6 is a perspective view of the seatbelt positioning assembly installed to the pillar structure of the vehicle, showing a pivoting arm of the seatbelt positioning assembly in the retracted orientation (a vertical orientation) in accordance with the embodiment.
Figure 9:
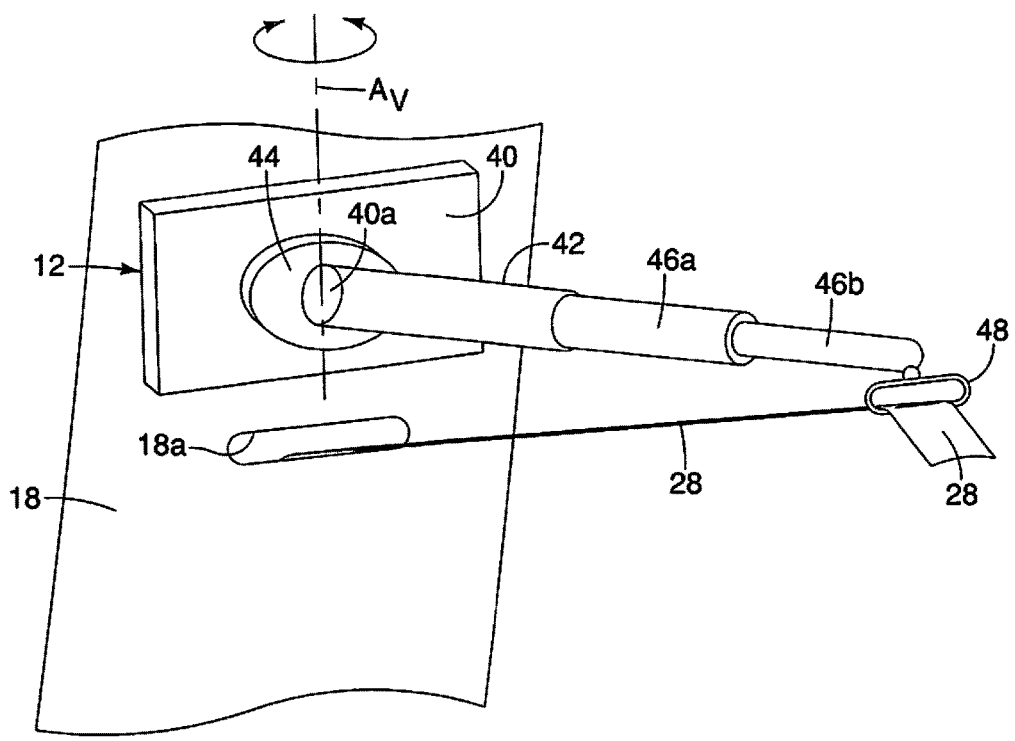
FIG. 9 is another perspective view of the seatbelt positioning assembly similar to FIGS. 7-9, showing the pivoting arm of the seatbelt positioning assembly pivoted about a vertical axis such that the D-ring is moved forward from the position and orientation shown in FIG. 8 in accordance with the embodiment.
Figure 10:
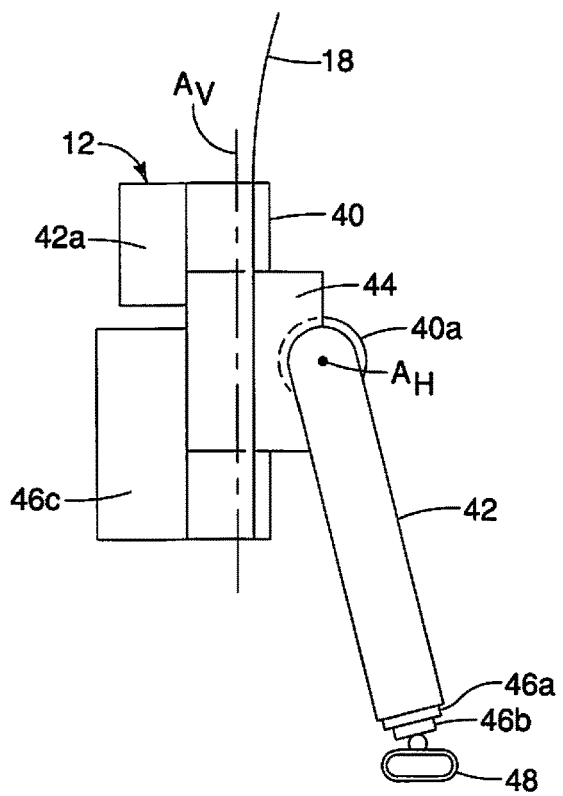
FIG. 10 is a side view of the pillar structure and the seatbelt positioning assembly showing the pivoting arm in the retraced orientation (angled vertically downward) in accordance with the embodiment.
Figure 13:
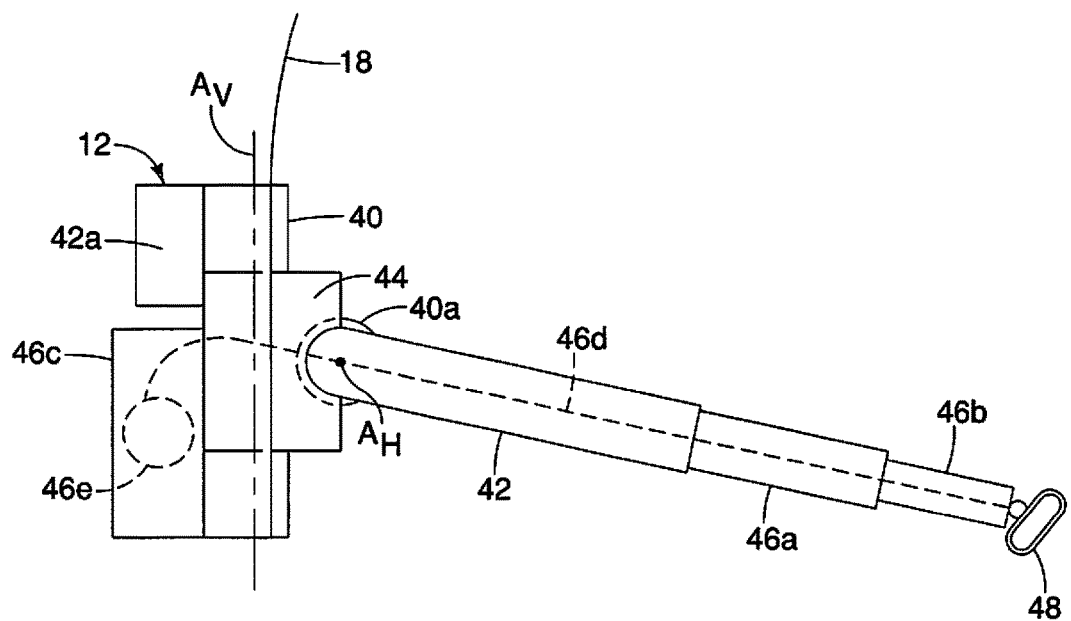
FIG. 13 is another side view of the pillar structure and the seatbelt positioning assembly similar to FIG. 12 showing the cable of the motor after telescopingly moving the extensible members (the telescoping members) of the pivoting arm to the extended orientation in accordance with the embodiment.

In other words, the control panel 54 is operated by the vehicle passenger in order to move the pivoting arm 42 and D-ring 48 relative to the base member 40 between a vertical orientation (also referred to as a stowed position) as shown in FIGS. 6 and 10 and a horizontal orientation (also referred to as an in-use or extended orientation) as shown in FIGS. 9 and 13.

The sensors 56 are basically an array of sensors (not shown) that can include the following: a seatbelt position sensor, seat position sensors, a pivoting arm sensor, a pivoting base sensor and an extensible members sensor.

The seatbelt position sensor of the sensors 56 can be installed to the retracting mechanism 34 or alternatively can be installed to the latch mechanism 38. The seatbelt position sensor can detect whether or not the seatbelt assembly 26 is in use or not in use. The seatbelt positioning sensor can detect the condition of the retracting mechanism 34 (flexible belt 28 being retracted or extended) or can detect the condition of the latch mechanism 38 (the latch tongue 36 being connected thereto or not connected thereto).

The seat position sensors are attached to the seat cushion portion 22 and detect the forward/rearward position of the seat cushion portion 22 relative to the floor structure 16, and can also be configured to detect an angle of inclination of the seatback portion 24 relative to the seat cushion portion 22. The pivoting arm sensor is connected to the motor 40a and detects the position of the pivoting arm 42 relative to pivoting movement about the horizontal axis $A_H$ and relative to the pivoting base 44. The pivoting base sensor is connected to the motor 42a and detects the position of the pivoting base 44 relative to pivoting movement about the vertical axis $A_V$ and relative to the base member 40. The extensible members sensor is part of or is connected to the motor 46c and detects the amount of telescoping movement of the extensible members 46a and 46b (and the D-ring 48) relative to the base member 40.

It should be understood from the drawings and the description herein that the sensors 56 are optional and are not required for operation of the seatbelt positioning assembly 12. Specifically, the motor 40a, the motor 42a and the motor 46c can be open-loop type stepper motors where feedback from sensors in not required for operation thereof. Alternatively, the motor 40a, the motor 42a and the motor 46c can be closed-loop stepper motors that require feedback from the sensors 56.

The electronic controller 50 operates the motor 40a, the motor 42a and the motor 46c as follows. FIGS. 6 and 10 show the pivoting arm 42 angled downward in the vertical or stowed orientation with the extensible members 46a and 46b fully retracted. The stowed orientation corresponds to a condition where the seatbelt assembly 26 is not in use (the latch tongue 36 is not connected to the latch mechanism 38 and/or the retracting mechanism 34 has retracted a corresponding section of the flexible belt 28). In response to detecting that the seatbelt assembly 26 is in use (the latch tongue 36 is now connected to the latch mechanism 38 and/or the flexible belt 28 has been drawn out of the retracting mechanism 34), the electronic controller 50 operates the motor 40a to pivot the pivoting arm 42 upward about the horizontal axis $A_H$ toward or to the horizontal orientation, as shown in FIGS. 7 and 11.

Thereafter, the motor 42a and the motor 46a are operated. Specifically, the motor 42a is operated to pivot the pivoting base 44 and the pivoting arm 42 about the vertical axis $A_V$ such that the D-ring 48 is moved from an initial position shown fin FIG. 9 to a forward position shown in FIG. 9. Simultaneously, the motor 46a is operated to telescopically extend the extensible members 46a and 46b from the retracted orientation shown in FIGS. 7, 11 and 12 to an extended position shown in FIGS. 8, 9 and 13.

Figure 7:
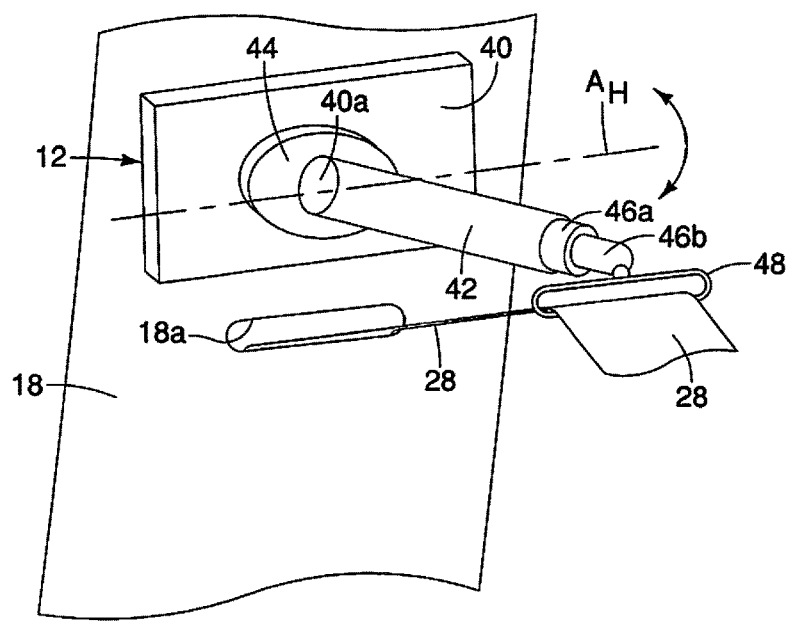
FIG. 7 is another perspective view of the seatbelt positioning assembly similar to FIG. 6, showing the seatbelt positioning assembly moved about a horizontal axis upward from the retracted orientation to a first intermediate orientation with a telescoping structure (extensible members) of the pivoting arm in a retracted orientation in accordance with the embodiment.
Figure 8:
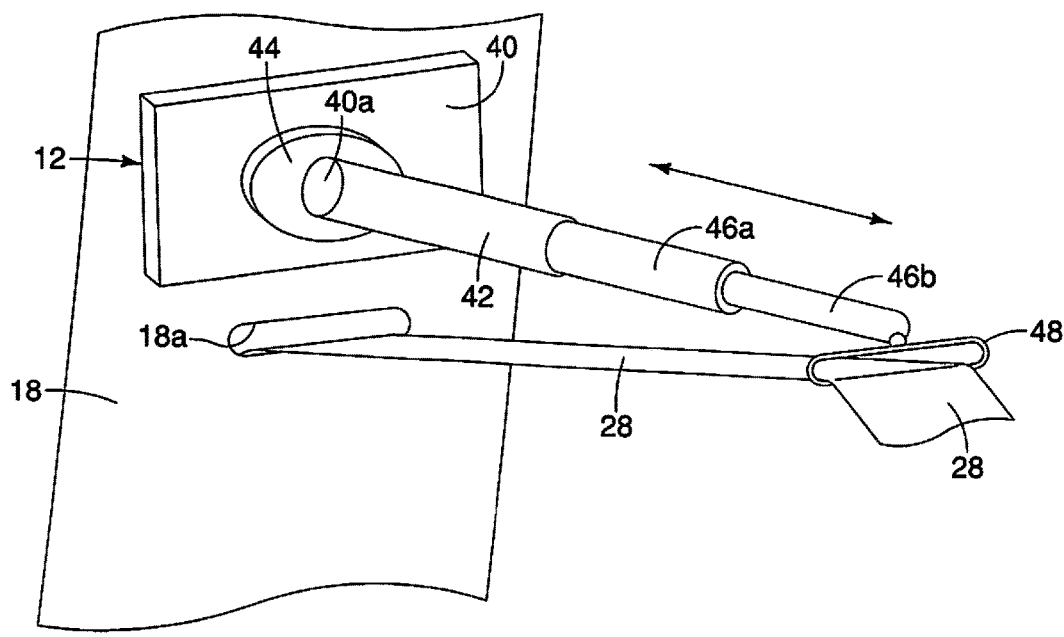
FIG. 8 is another perspective view of the seatbelt positioning assembly similar to FIGS. 7 and 8, showing the pivoting arm of the seatbelt positioning assembly in the first intermediate orientation and further showing the telescoping structure in an extended orientation moving a D-ring outward and away from the pillar structure in accordance with the embodiment.
Figure 11:
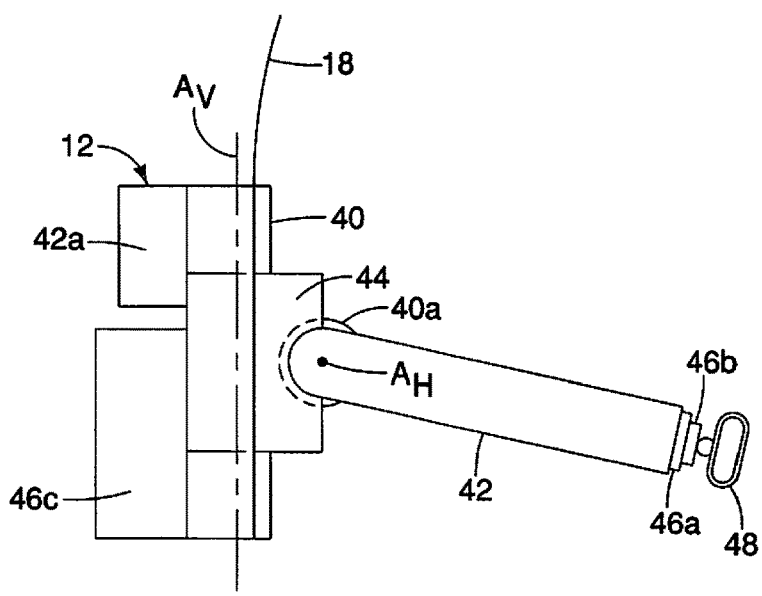
FIG. 11 is another side view of the pillar structure and the seatbelt positioning assembly similar to FIG. 10 showing the pivoting arm in the first intermediate orientation having been pivoted upward about the horizontal axis in accordance with the embodiment.
Figure 12:
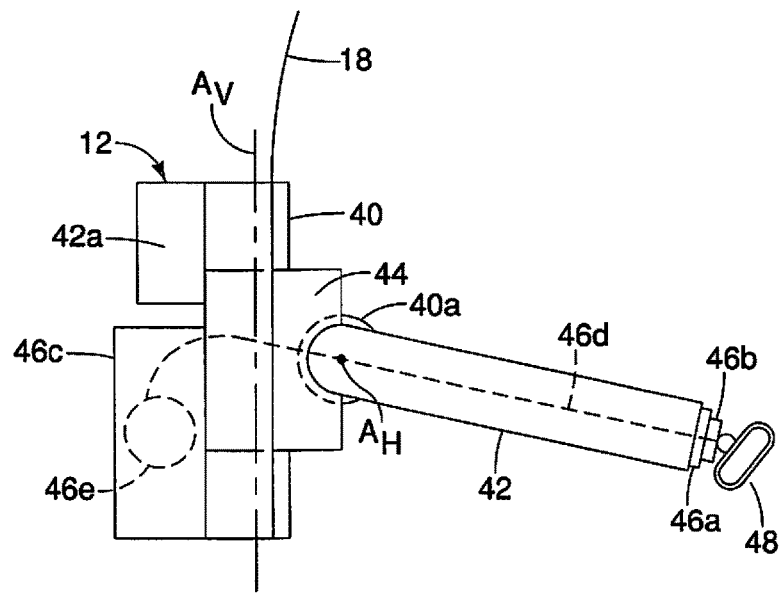
FIG. 12 is another side view of the pillar structure and the seatbelt positioning assembly similar to FIG. 11 showing a motor connected via a cable to extensible members (telescoping members) of the pivoting arm in the first intermediate orientation and showing the extensible members in the retracted orientation in accordance with the embodiment.

FIGS. 6 and 10 basically show the D-ring 48 in a first location spaced apart from the base member 40 by a first distance, FIGS. 7, 11 and 12 show the D-ring 48 a second distance from the base member 40 and FIGS. 8, 9 and 13 show the D-ring 48 a third distance from the base member 40, where the third distance is greater than the first and second distances, and the second distance is greater than the first distance.

The electronic controller 50 is further configured to store in memory, data associated with the positioning of the D-ring 48 relative to the base member 40 (and the pillar structure 18). For example, the vehicle passenger can operate the control panel 54 while seated in the seat assembly 20 and operate each of the motors 40a, 42a and 46c in order to position the D-ring 48 to a location where the flexible belt 28 extends over a shoulder area of the vehicle passenger and is comfortable. This final position or extended position is saved in memory by the electronic controller 50 for future use in response to save instructions entered into the control panel 54 by the vehicle passenger. Consequently, every time thereafter that the vehicle passenger sits in the seat assembly 20, the D-ring 48 can be returned or re-positioned by the electronic controller 50 to the saved position by automatically operating the position mechanism defined by the motors 40a, 42a and 46c. It should be understood that the electronic controller 50 is further provided with data corresponding to moving the seatbelt positioning assembly 12 to the stowed orientation in FIGS. 6 and 10 in response to determining that the seatbelt assembly 26 is no longer in use.

It should also be understood that the electronic controller 50 can further save a plurality of differing data corresponding to differing extended positions, one extended position for each differing vehicle passenger that regularly sits in the seat assembly 20.

The electronic controller 50 preferably includes a microcomputer with a seatbelt positioning control program that controls the positioning of the seatbelt positioning assembly 12, as discussed above. The electronic controller 50 can also include other conventional components such as an input interface circuit, an output interface circuit, and storage devices such as a ROM (Read Only Memory) device and a RAM (Random Access Memory) device. The microcomputer of the electronic controller 50 is programmed to control the seatbelt positioning assembly 12. The electronic controller 50 is capable of selectively controlling any of the components of the seatbelt positioning assembly 12. It will be apparent to those skilled in the art from this disclosure that the precise structure and algorithms for the electronic controller 50 can be any combination of hardware and software that will carry out the functions of the present invention.

The vehicle structures and features shown in FIG. 1 are conventional components that are well known in the art. Since these vehicle structures and features are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the seatbelt positioning assembly. Accordingly, these terms, as utilized to describe the present invention should be interpreted relative to a vehicle equipped with the seatbelt positioning assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A seatbelt positioning assembly, comprising:
   a base member configured to attach to a vehicle pillar structure of a vehicle adjacent to a vehicle seat assembly;
   an extensible member coupled to the base member, with a D-ring of a seatbelt assembly being fixed to a distal end of the extensible member;
   a positioning mechanism connected to the extensible member and supported to the base member, the position mechanism being configured to move the extensible member such that the D-ring is positioned and re-positioned between a stowed position adjacent the vehicle pillar structure in which the extensible member extends downward from the base member in a vertical orientation and an extended position adjacent to the vehicle seat assembly in which the extensible member is in a horizontal orientation, the positioning mechanism including an electric motor configured to pivot the extensible member about a horizontally oriented axis from the stowed position upward toward the extended orientation; and
   an electronic controller connected to the positioning mechanism and configured to operate the positioning mechanism to move the extensible member positioning the D-ring between the stowed position and the extended position.

2. The seatbelt positioning assembly according to claim 1, wherein
   the electronic controller is connected to the electric motor and is configured to operate the electric motor to pivot the extensible member about the horizontally oriented axis.

3. The seatbelt positioning assembly according to claim 1, wherein
   the extensible member includes a telescoping structure such that in the horizontal orientation the D-ring is movable from a first location spaced apart from the base member by a first distance and a second location spaced apart from the base member by a second distance greater than the first distance.

4. The seatbelt positioning assembly according to claim 3, wherein the electronic controller is connected to the telescoping structure and is configured to operate the telescoping structure to move the distal end of the extensible member and the D-ring between the first location and the second location.

5. The seatbelt positioning assembly according to claim 1, wherein
the base member includes a pivoting structure defining a vertically oriented axis such that in the horizontal orientation the extensible member and the D-ring are pivotal about the vertically oriented axis.

6. The seatbelt positioning assembly according to claim 5, wherein
the electronic controller is connected to the pivoting structure and is configured to operate the pivoting structure to pivot the extensible member and the D-ring about the vertically oriented axis.

7. A seatbelt positioning assembly, comprising:
a vehicle seat assembly having a seat cushion portion and a seatback portion;
a seat positioning mechanism configured to position the seat cushion portion relative to a seat supporting track and position the seatback portion relative to the seat cushion portion;
a base member configured to attach to a vehicle pillar structure of a vehicle adjacent to the vehicle seat assembly;
an extensible member coupled to the base member, with a D-ring of a seatbelt assembly being fixed to a distal end of the extensible member;
a positioning mechanism connected to the extensible member and supported to the base member, the position mechanism being configured to move the extensible member such that the D-ring is positioned and re-positioned between a stowed position adjacent the vehicle pillar structure and an extended position adjacent to the vehicle seat assembly; and
an electronic controller connected to the positioning mechanism and configured to operate the positioning mechanism to move the extensible member positioning the D-ring between the stowed position and the extended position, the electronic controller is further configured to store data defining the stowed position and the extended position; and
a control panel connected to the electronic controller and the seat positioning mechanism, the control panel having a control section for inputting data relating to manual seat cushion portion positioning, seatback portion positioning and D-ring positioning, the electronic controller being further configured to store data defining a first seat cushion portion position, a first seatback portion position and a first extended position of the D-ring as set via operation of the control panel.

8. The seatbelt positioning assembly according to claim 7, wherein
the electronic controller is further configured to automatically re-position the seat cushion portion, the seatback portion and the D-ring in response to selection of the first seat cushion portion position, the first seatback portion position and the first extended position of the D-ring in response to selections made via operation of the control panel.

9. A seatbelt positioning assembly
a vehicle body structure having a floor structure and a pillar structure that at least partially define a passenger compartment;
a seat assembly installed to the floor structure adjacent to the pillar structure;
a seatbelt assembly with a first end attached to the pillar structure and a second end attached to the seat assembly;
a base member attached to the pillar structure of a vehicle adjacent to a vehicle seat assembly;
an extensible member movably coupled to the base member, with a D-ring of the seatbelt assembly being fixed to a distal end of the extensible member, and a flexible belt of the seatbelt assembly extending through the D-ring;
a positioning mechanism connected to the extensible member and supported to the base member, the position mechanism being configured to selectively move the extensible member in order to position and re-position the D-ring and flexible belt between a stowed position adjacent the pillar structure and a plurality of extended positions adjacent to the vehicle seat assembly such that in the stowed position the D-ring and flexible belt are adjacent to the pillar structure and in the extended position the D-ring and portions of the flexible belt are spaced apart from the pillar structure; and
an electronic controller connected to the positioning mechanism and configured to operate the positioning mechanism to move the extensible member and the D-ring between the stowed position and the extended position, the positioning mechanism includes an electric motor configured to pivot the extensible member about a horizontal axis.

10. The seatbelt positioning assembly according to claim 9, wherein
the electric motor of the positioning mechanism is further configured to pivot the extensible member about a vertical axis.

11. The seatbelt positioning assembly according to claim 9, wherein
the positioning mechanism includes an electric motor coupled to the extensible member, the extensible member including a telescoping structure such that the D-ring is movable from a first location spaced apart from the base member by a first distance and a second location spaced apart from the base member by a second distance greater than the first distance.

12. The seatbelt positioning assembly according to claim 9, wherein
the electronic controller is further configured to store data defining the stowed position and the extended position.

13. A seatbelt positioning assembly
a vehicle body structure having a floor structure and a pillar structure that at least partially define a passenger compartment;
a seat assembly installed to the floor structure adjacent to the pillar structure;
a seatbelt assembly with a first end attached to the pillar structure and a second end attached to the seat assembly;
a base member attached to the pillar structure of a vehicle adjacent to a vehicle seat assembly;
an extensible member movably coupled to the base member, with a D-ring of the seatbelt assembly being fixed to a distal end of the extensible member, and a flexible belt of the seatbelt assembly extending through the D-ring;
a positioning mechanism connected to the extensible member and supported to the base member, the position mechanism being configured to selectively move the extensible member in order to position and re-position the D-ring and flexible belt between a stowed position adjacent the pillar structure and a plurality of extended positions adjacent to the vehicle seat assembly such that in the stowed position the D-ring and flexible belt are adjacent to the pillar structure and in the extended position the D-ring and portions of the flexible belt are spaced apart from the pillar structure; and an electronic controller connected to the positioning mechanism and configured to operate the positioning mechanism to move the extensible member and the D-ring between the stowed position and the extended position, the positioning mechanism includes an electric motor configured to pivot the extensible member about a vertical axis.

14. The seatbelt positioning assembly according to claim 13, wherein the positioning mechanism includes an electric motor coupled to the extensible member, the extensible member including a telescoping structure such that the D-ring is movable from a first location spaced apart from the base member by a first distance and a second location spaced apart from the base member by a second distance greater than the first distance.

15. The seatbelt positioning assembly according to claim 13, wherein the electronic controller is further configured to store data defining the stowed position and the extended position.

16. The seatbelt positioning assembly according to claim 13, wherein the electric motor of the positioning mechanism is further configured to pivot the extensible member about a horizontal axis.

* * * * *